United States Patent [19]
Lanz

[11] Patent Number: 4,796,848
[45] Date of Patent: Jan. 10, 1989

[54] PLASTIC-CLAD, ELECTRICALLY INSULATED, METAL PIPE HANGER

[76] Inventor: Donald D. Lanz, 15702 S. Neibur Rd., Oregon City, Oreg. 97045

[21] Appl. No.: 31,582

[22] Filed: Mar. 30, 1987

[51] Int. Cl.4 .............................................. F16B 15/00
[52] U.S. Cl. .................................... 248/71; 248/216.1
[58] Field of Search ..................... 248/71, 74.1, 74.5, 248/216.1, 216.4, 217.3; 174/163 R, 163 F, 159, 164, 158 F; 411/508, 485

[56] References Cited

U.S. PATENT DOCUMENTS

| | | | |
|---|---|---|---|
| Re. 22,992 | 3/1948 | Rachlin | 248/71 |
| 268,613 | 12/1882 | Brinkerhoff | 411/485 |
| 843,916 | 2/1907 | Taylor | 174/159 |
| 2,279,866 | 4/1942 | Ellinwood | 248/71 UX |
| 2,291,148 | 7/1942 | Carson | 248/71 X |
| 2,514,256 | 7/1950 | Rachlin | 248/71 |
| 2,567,386 | 9/1951 | Lind | 248/71 |
| 3,499,359 | 3/1970 | Yrjanainen | 248/71 |
| 3,934,802 | 1/1976 | Jennings | 411/485 X |

Primary Examiner—J. Franklin Foss
Attorney, Agent, or Firm—Eugene D. Farley

[57] ABSTRACT

An electrically insulative pipe hanger for supporting metal fluid conduits. The pipe hanger comprises a metal shank segment and an integral metal pipe-receiving hook segment merging with the shank segment through an inwardly facing throat segment. Overlying at least a portion of the hook segment is a sheath of electrically insulative, flexible plastic tubing positioned for bearing contact with the pipe and insulating the same from the hanger. The sheath includes a substantially half round segment overlying the throat segment of the hanger. The hanger is manufactured by pushing a length of flexible tubing having a half round leading end over the tip end of the hanger until the half round portion overlies the hanger throat segment.

2 Claims, 1 Drawing Sheet

U.S. Patent   Jan. 10, 1989   4,796,848
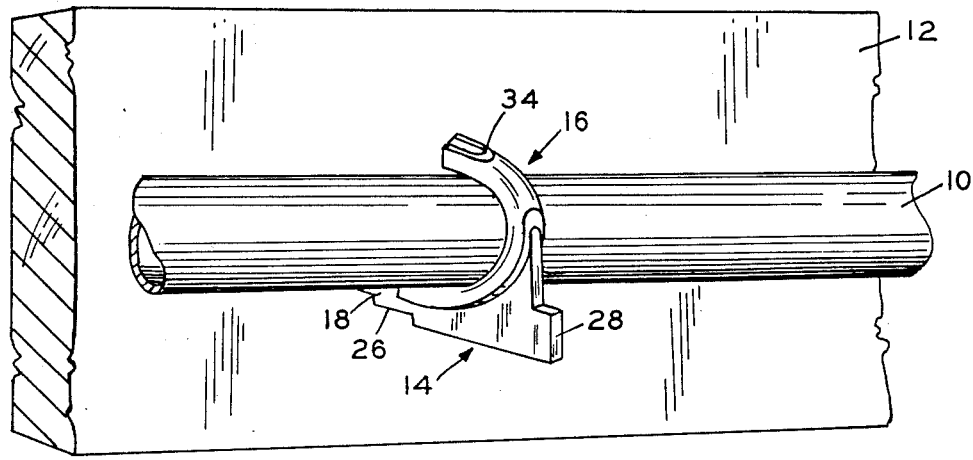
FIG.1
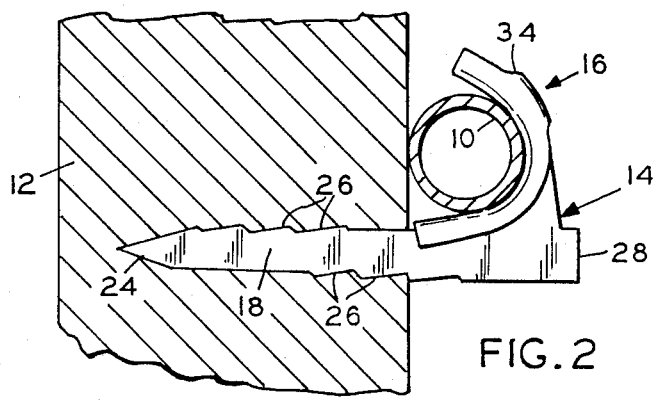
FIG.2
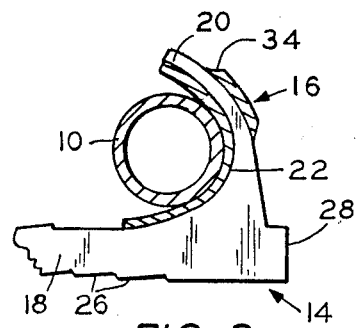
FIG.3
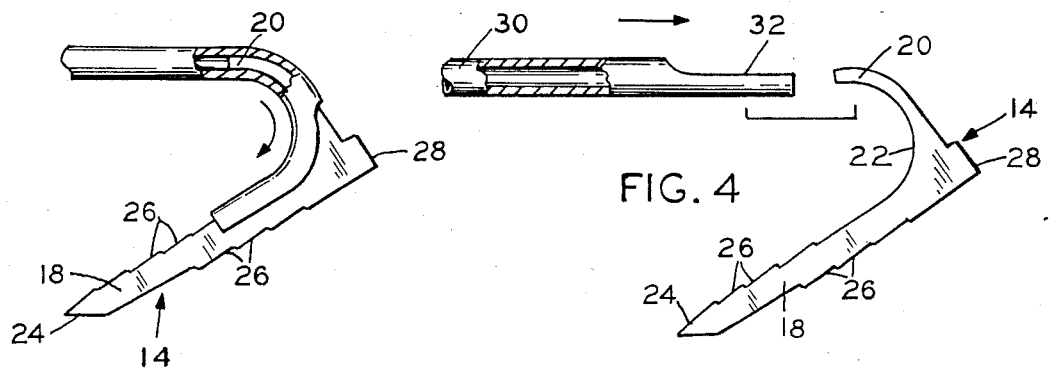
FIG.4
FIG.5
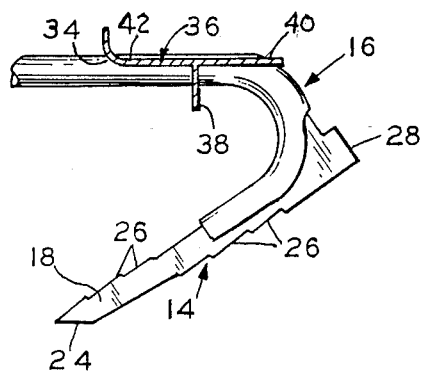
FIG.6

PLASTIC-CLAD, ELECTRICALLY INSULATED, METAL PIPE HANGER

BACKGROUND AND GENERAL STATEMENT OF THE INVENTION

This invention relates to hangers for suspending metal pipes and other conduits from wooden beams or other support members.

Conduits made from copper, iron, or other metals commonly are used to transport fluids from place to place. In use they are suspended from wooden beams or other supports by means of metal hangers that are driven into the beams.

Since the hangers customarily are of a metal dissimilar to that comprising the conduits, the probability exists of electrolytic corrosion occurring at the interface between hanger and conduit.

To prevent this, it is common practice to dip the hanger into a molten plastic having electrical insulating properties, thereby providing a plastic-coated, insulated hanger. This procedure is subject to the disadvantage that the plastic coating often is formed with voids which leave the metal exposed or covered with a very thin layer subject to wear upon working of the conduit in use. The coating also gives very little protection to the conduit against crushing. Furthermore, it is relatively expensive to apply and requires an appreciable amount of processing time.

It accordingly is the general object of the present invention to provide an electrically insulated, plastic clad hanger for metal conduits which overcomes the afore going problems; which is fast and inexpensive to manufacture; which is adaptable to continuous fabrication techniques; and which is characterized by the presence of a heavy duty, highly efficient plastic sheath.

Broadly stated, the pipe hanger achieving the foregoing and other purposes of the invention comprises a metal, stud-like shank segment and an integral metal, pipe receiving hook segment emerging with the shank segment through an inwardly facing throat. A sheath of flexible, electrically insulating plastic tubing overlies at least a portion of the hook segment. It is positioned for bearing contact with the pipe and for insulating the same from the hanger.

The plastic tubing sheath includes a substantially half-round segment overlying the throat segment of the hanger. It provides a flexible leader for threading the sheath over the hook in the manufacture of the hanger.

THE DRAWINGS

In the drawings:

FIG. 1 is a perspective view of the plastic-clad, electrically-insulated, metal pipe hanger of my invention, in its use position;

FIG. 2 is a side elevation thereof;

FIG. 3 is a fragmentary side elevation of the hanger with the plastic cladding in section; and FIGS. 4, 5 and 6 are views in side elevation, partly in section, illustrating the method of making the hanger.

DESCRIPTION OF A PREFERRED EMBODIMENT OF THE INVENTION

As illustrated in FIG. 1, the hanger of my invention is adapted for use in mounting a pipe 10 on a wooden or other support such as beam 12. The position of mounting may be with the hanger located horizontally, as illustrated, or, if desired, with the hanger mounted vertically.

Although the hanger may be employed to support various types of pipes and conduits, it is designed particularly for use with copper, iron, or other round, metallic pipes in which there may be a dissimilar metal corrosion problem.

As shown particularly in FIG. 2, the hanger assembly includes a drivable, stud-like component indicated generally at 14, and a sheath component, indicated generally at 16.

The stud component 14 is designed to be driven into the wooden support. It includes a shank segment 18 and an integral hook segment 20.

The hook segment is adapted to receive the pipe. It merges with the shank segment through an inwardly facing throat segment 22, FIG. 4. All three segments are integral with each other and adapted for manufacture by a stamping operation.

Shank segment 18 is formed with a pointed end 24. This is shaped symmetrically to insure, that upon driving the stud into the timber, it will not cant to one side during the driving operation.

Shank segment 18 also is formed with reversely directed teeth 26, the teeth on one side being directed in a first direction and the teeth on the other side being directed in the other direction. This insures that the shank will not work out of the timber under changing temperature and moisture conditions.

Shank segment 18 is further provided with a head 28 which is used when driving the stud into the timber.

Hook segment 20 is dimensioned to receive and support pipe 10. It is dimensioned sufficiently generously so that a single unit can accommodate pipes of varying size.

It is a feature of the invention that sheath 16 can be provided originally in the form of a length of continuous tubing of a size such that it can be forced over the hook segment 20 and thus mounted on the hanger. It may be fabricated from any suitable electrically-insulating, wear resistant material such as a plastic material, or a natural or synthetic rubber. As used herein, the term "plastic" is intended to signify all of these materials.

Illustrative of suitable plastic materials are polyethylene, polypropylene, neoprene and the like.

As shown in FIGS. 4–6, the flexible plastic tube 30 has a cutaway, substantially half round leading end 32.

To mount the tube on the hook end of the stud, the two components of the assembly are positioned as illustrated in FIG. 4. The tube is pushed endwise in the direction of the stud, whereupon the flexible leading end 32 follows the curve of the hook and the throat, leading the otherwise rather stiff and inflexible tube onto the latter. When it is fully positioned, with the half round leading end covering the throat and the full round covering the hook, it is cut off to form the finished, insulated hanger.

Preferably the sheath also is cut away opposite the outer tip end of the hook to form a cutaway portion 34, FIG. 3. This is done for the sake of appearance. It also is done in order to eliminate the pocket which otherwise might be formed at the hook end, and would collect water or moisture during the use of the hanger, resulting in a corrosion problem.

The foregoing operations may be carried out to best advantage using a special knife 36, FIG. 6.

Knife 36 is T-shaped in cross section. In its operation, the stem 38 of the "T" cuts the tubing to length; one portion 40 of the cross bar cuts away the tubing at the tip of the hanger to form cutout 34; and the other segment 42 of the cross bar, being arcuate, forms a half round segment 32 in tubing 30, ready for application of the tubing to a subsequent hook.

Having thus described in detail a preferred embodiment of the present invention, it will be apparent to those skilled in the art that various physical changes may be made in the device described herein without altering the inventive concepts and principles embodied. The present embodiment is therefore to be considered in all respects as illustrative and not restrictive, the scope of the invention being indicated by the appended claims. All changes which come within the meaning and range of equivalency of the claims are therefore to be embraced therein.

I claim:

1. A pipe hanger comprising:
   (a) a metal stud-like shank segment and an integral metal, pipe-receiving hook segment merging with the shank segment through an inwardly facing throat segment, and
   (b) a sheath of electrically insulating flexible plastic tubing having a substantially half-round inner end segment overlying the inner surface of the throat segment and a tubular segment outwardly of the inner end segment encircling at least a portion of the hook segment and overlying the inner surface of the hook segment.

2. The pipe hanger of claim 1 wherein the outer end portion of the tubular segment is cut away on the side of the tip end of the hook segment opposite the inner surface thereof.

* * * * *